Figure 1:
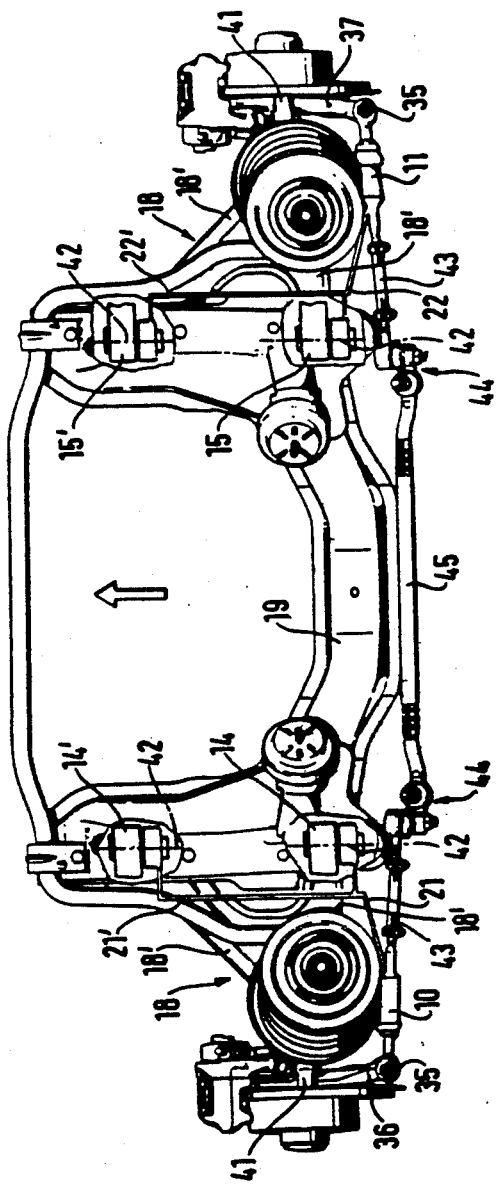

United States Patent [19]

Bausch

[11] Patent Number: 4,881,749
[45] Date of Patent: Nov. 21, 1989

[54] STEERABLE FRONT AXLE FOR MOTOR VEHICLES

[75] Inventor: Paul Bausch, Hattenheim, Fed. Rep. of Germany

[73] Assignee: General Motors Corporation, Detroit, Mich.

[21] Appl. No.: 241,044

[22] Filed: Sep. 6, 1988

[30] Foreign Application Priority Data

Sep. 9, 1987 [DE] Fed. Rep. of Germany ....... 3730244

[51] Int. Cl.$^4$ .............................................. B62D 7/20
[52] U.S. Cl. ................... 280/95.1; 280/661; 280/716
[58] Field of Search ................ 280/88, 95.1, 846, 661, 280/716

[56] References Cited

U.S. PATENT DOCUMENTS

| 3,498,630 | 3/1970 | Crawford | 280/661 |
|---|---|---|---|
| 4,717,175 | 1/1988 | Arai et al. | 280/661 |
| 4,726,603 | 2/1988 | Suaiyama et al. | 280/661 |
| 4,747,614 | 5/1988 | Kuroyanai et al. | 280/661 |

FOREIGN PATENT DOCUMENTS 853578  5/1957  United Kingdom .

Primary Examiner—Kenneth R. Rice
Attorney, Agent, or Firm—Saul Schwartz

[57] ABSTRACT

The present invention pertains to a steerable front axle for motor vehicles with a steering knuckle for each of the two front wheels, which steering knuckle is pivotedly mounted on at least one axle connecting rod supported pivotely on the chassis via a connecting rod bearing. The axes of rotation of the connecting rod bearings are essentially arranged in the longitudinal direction of the vehicle. A steering tie rod, which is linked with the corresponding steering knuckle, is associated with each of the front wheels. A steering mechanism connected to the steering tie rods is provided between the two steering tie rods. The steering tie rods have an expansion chamber for the hydraulic length adjustment, into which hydraulic fluid can be admitted. Both of the connecting rod bearings associated with each of the front wheels have a hollow displacement zone which can be compressed in the longitudinal direction of the vehicle, in which the hydraulic fluid is located which will enter the expansion chamber of the steering tie rod of the associated front wheel via a hydraulic tube in the case of the compression of the displacement zone which occurs during braking.

9 Claims, 2 Drawing Sheets

STEERABLE FRONT AXLE FOR MOTOR VEHICLES

The invention pertains to a steerable front axle for motor vehicles comprising one steering knuckle for each of the two front wheels, which knuckle is rotatably mounted on the chassis by at least one pivotedly supported axle connecting rod via a connecting rod bearing, in which the axes of rotation are essentially arranged in the longitudinal direction of the motor vehicle, and one steering tie rod each, which is associated with each of the front wheels and is linked with a steering tie rod layer connected to the corresponding steering knuckle, and a steering mechanism connected to the two steering tie rods is arranged between these steering tie rods.

Such front axles are used to suspend the steerable front wheels in motor vehicles with front-wheel drive and rear-wheel drive alike. A toe-in is set with the steering tie rods connected to the steering knuckles via steering tie rod levers to reduce the tendency of the front wheels to flutter.

If such a vehicle is driven on a road surface with different coefficients of friction, $\mu$, e.g., the right-hand wheels of the vehicle are rolling on ice and the left-hand wheels of the vehicle on concrete (so-called $\mu$ split), the motor vehicle will be braked more strongly on the left-hand side than on the right-hand side, and a yaw acceleration may occur.

The basic task of the present invention is to provide a steerable front axle of the type specified in the introduction, which ensures the straight-line stability during braking in the case of a $\mu$ split, i.e., during braking on a road surface which has different coefficients of friction next to each other in the longitudinal direction.

This task is accomplished according to the present invention by the steering tie rods having an expansion space for hydraulic length adjustment, into which space a hydraulic fluid can be admitted, and by both of the connecting rod bearings, each associated with one front wheel, having a hollow displacement zone compressible in the longitudinal direction of the vehicle between the junction points for the axle connecting rod and the chassis, in which zone the hydraulic fluid is accommodated which enters the expansion chamber of the steering tie rod of the corresponding front wheel via a hydraulic tube in the case of the compression of the displacement zone which occurs during braking.

By means of the steering tie rods, whose length is hydraulically adjustable, and the displacement zones of the connecting rod bearings, which zones are connected to the steering tie rods, as specified in the present invention, it is achieved that the braking forces occurring between the axle connecting rod and the chassis of the longitudinal direction of the vehicle during the braking of a motor vehicle bring about a compression of the displacement zones, so that hydraulic fluid leaves them and enters the expansion chambers of the steering tie rods, so that the length of the latter will change to increase the toe-in. For example, in the case of braking on a $\mu$ split, the left front wheel is braked more strongly than the right one, so that the connecting rod bearings associated with the left front wheel will also be compressed more strongly than the connecting rod bearings associated with the right front wheel. Thus, more hydraulic fluid is forced from the left connecting rod bearings into the expansion chamber of the left steering tie rod, which cause the left steering tie rod to undergo a greater change in length than the right steering tie rod. Consequently, the left front wheel is also turned more strongly into the toe-in than the right front wheel, as a consequence of which a steering force opposing the yawing acceleration is generated, so that the vehicle will continue to move in a straight line.

Consequently, automatic compensation for the yawing accelerations acting on the vehicle is achieved, so that the driver of the vehicle does not need to consciously steer against the yawing acceleration.

Another essential advantage of the present invention is the fact that the different turning of the front wheels into the toe-in is eliminated as soon as the $\mu$ split of the road surface disappears, so that the vehicle is kept in the straight direction.

It is also advantageous that, regardless of the condition of the road surface, the motor vehicle is also prevented from swerving which would be caused, e.g., by front wheel brakes acting differently because of differences in wear, because the wheel being braked most strongly is turned more into the toe-in than the front wheel being braked less strongly in this case as well.

In the case of a steerable front axle according to the present invention, in which each steering knuckle is supported pivotedly on the chassis with a front and rear axle connecting rod arm by a connecting rod bearing, each connecting rod bearing has a hollow displacement zone. It is thus achieved in the case of a front axle with connecting rod bearings which are connected in series in terms of function that an increased total hydraulic fluid volume is available for changing the length of the associated steering tie rod.

In an advantageous improved variant of the present invention, the displacement zones of the left and right connecting rod bearings form a closed hydraulic system with the expansion chamber of the left and right steering tie rods. The maintenance on the front axle according to the present invention is thus limited to the usual maintenance procedures, since practically no loss of hydraulic fluid can occur as a consequence of the closed hydraulic systems, so that they are practically maintenance-free.

A simple constructive design of the present invention is characterized in that the displacement zone has a hydraulic piston and a hydraulic cylinder which are elastically pretensioned away from each other.

To generate the spring force needed to reset the piston-cylinder assembly of the connecting rod bearing in a simple manner, a preferred practical embodiment is designed such that each axle connecting rod or each axle connecting rod arm is mounted on an elastic sleeve which has a bellows vulcanized into the cylinder on the chassis mounting side, and the bellows surrounds the hydraulic fluid limited by the sleeve and on the side turned away from the bellows, the cylinder is connected to a closing plate fastened to the chassis, which plate limits the hydraulic fluid on the side opposite the sleeve and has a connecting bore for the hydraulic tube leading to the corresponding steering tie rod, and the connecting rod bearing is advantageously fastened to the chassis with a vulcanized locking bolt on the opposite side.

Due to the resulting good resetting after braking of the connecting rod bearings on disappearance of the braking forces acting on them, the entire volume of the cylinder-piston assembly of the connecting rod bearing(s) is available for receiving the hydraulic fluid practically immediately after the end of the braking process, so that the toe-in adjustment can be eliminated by the steering tie rods particularly rapidly, so that the toe-in needed for normal straight-line driving without braking again becomes established.

According to an embodiment of particularly simple construction of the present invention, each steering tie rod had a hydraulic cylinder in which a hydraulic piston defining the expansion chamber is arranged, the piston being elastically pretensioned against the hydraulic cylinder, a first steering tie rod section with a fastening means arranged on it is integral with the hydraulic cylinder of the steering tie rod, and a piston rod of the hydraulic piston projecting from the hydraulic cylinder forms a second steering tie rod section, with a connecting pin for linking the steering tie rod to the steering tie rod lever being arranged at the end of the second section which is turned away from the piston.

To guarantee satisfactory setting of the toe-in during normal driving without braking, a preferred embodiment of the present invention is designed such that the hydraulic piston of the steering tie rod is pretensioned against the bottom of the hydraulic cylinder by a compressive coil spring, and the hydraulic piston abuts against the bottom in its end position. It is thus guaranteed in the event the connecting rod bearings are not subjected to braking forces that the steering tie rods will always have an exactly defined length, so that the toe-in set for the normal driving of the vehicle can be accurately maintained.

Another preferred embodiment of the present invention is characterized in that the compressive coil spring, one end of which is supported by the side of the hydraulic piston which is turned away from the expansion chamber, is supported at its other end by a guide bush for the piston rod of the hydraulic piston, which bush is inserted into the hydraulic cylinder. This ensures a particularly stable steering tie rod, because the two steering tie rod sections can be guided at relatively spaced-apart points in the piston-cylinder zone.

Figure 2:
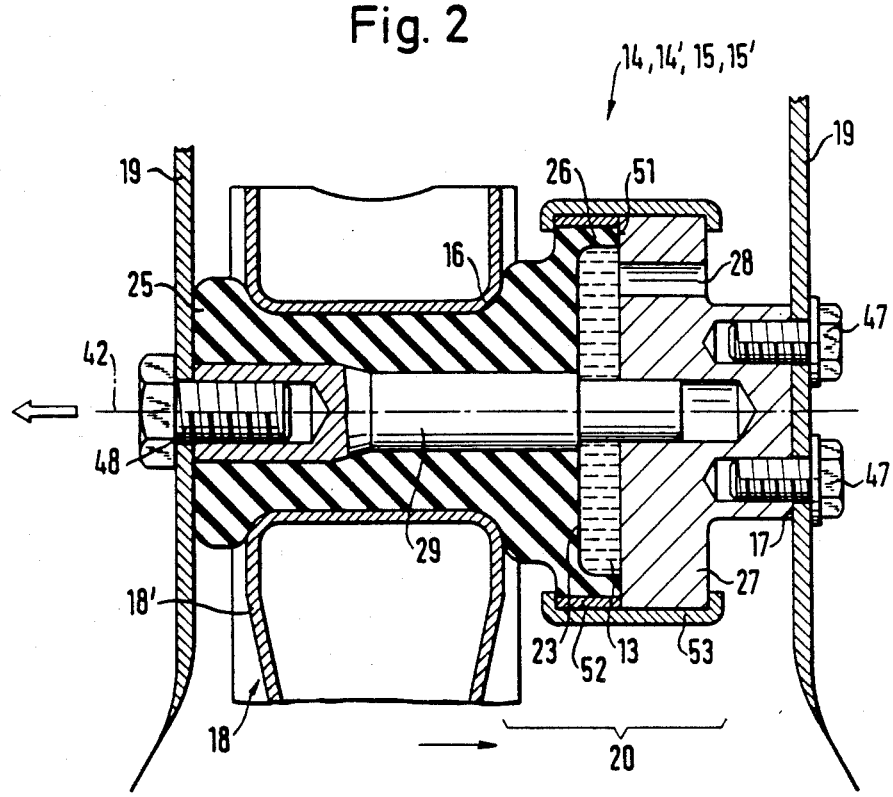
Figure 3:
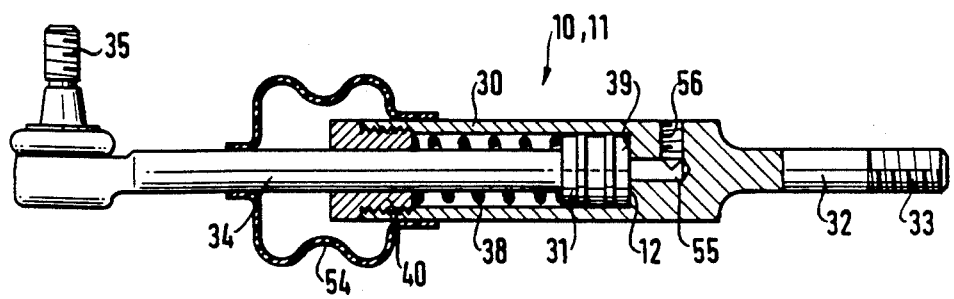

The present invention will be described below in greater detail based on the drawing. In the drawing, FIG. 1 shows a top view of a steerable front axle, FIG. 2 shows a longitudinal section of a connecting rod bearing of the front axle according to FIG. 1, and FIG. 3 shows a longitudinal section of a steering tie rod of the front axle according to FIG. 1.

Identical components in the different figures in the drawing are designated by the same reference numerals.

According to FIG. 1, the steering knuckles 41 are suspended pivotely on the essentially horizontally arranged axle connecting rods 18 in the usual manner not shown in detail, and an axle connecting rod 18 with axle connecting rod arms 18' is associated with each steering knuckle 41. The axle connecting rod arms 18' are suspended on the chassis or the front axle support via connecting rod bearings 14,14'; 15,15'. The axes of rotation 42 of the connect-rod bearings are aligned in the longitudinal direction of the vehicle. The arrows in FIGS. 1 and 2 show the direction of travel and the longitudinal direction of the motor vehicle.

A steering tie rod lever 36 or 37, which essentially extends in the rearward direction in the longitudinal direction of the vehicle, is attached to each steering knuckle 41. One end of a steering tie rod 10 or 11 arranged at right angles to the longitudinal direction of the vehicle is linked to the rear end of each steering tie rod lever 36 or 37 via a connecting pin 35, while the other end of each steering tie rod 10 or 11 is connected to a steering mechanism 45 via an intermediate rod 43 and a joint arrangement 44 which permits swerving movement of the steering tie rod around a longitudinal axis and around a vertical axis.

Hydraulic tubes 21,21', which connect the displacement zones 20 of the connecting rod bearings 14,14' to the expansion chamber 12 of the steering tie rod 10, are provided between the connecting rod bearings 14,14' of the axle connecting rod 18 for the left front wheel and the corresponding steering tie rod 10, so that a closed hydraulic system is formed. The displacement zones 20 of the connecting rod bearings 15,15' associated with the right front wheel are connected in the same manner to the expansion chamber 12 of the steering tie rod 11 via the hydraulic tubes 22,22'.

According to FIG. 2, each connecting rod bearing 14,14'; 15,15' is fastened to the chassis 19 via a closing plate 27 in a suitable manner, e.g., by means of screws and locking bolts 47,48,29. The closing plate 27 has a cylindrical external circumference and has a connecting bore 28 for one of the hydraulic tubes 21,21'; 22,22', which leads to a chamber filled with hydraulic fluid 13 which is defined by an elastic bellows 26 of essentially cylindrical shape and by one of the end faces 51 of an elastic sleeve 25. The bellows 26 is vulcanized on its external circumference to a sleeve-like and circular cylinder 52 whose external circumference is aligned with the external circumference of the closing plate 27. To fasten the bellows 26 and consequently the elastic sleeve 25 to the closing plate 27, the closing plate 27 and the cylinder 52 are rigidly inserted into a retaining sleeve 53 whose axial ends are beaded.

The bellows 26 is integral with the sleeve 25. The sleeve 25 and the bellows 26 are made, in general, of rubber.

The rubber sleeve 25 is surrounded by one of the axle connecting rods 18' of an axle connecting rod 18. The locking bolt 29, which practically extends in the longitudinal direction of the vehicle, is vulcanized into the rubber sleeve 25. At its end facing the closing plate 27, the locking bolt 29 reaches into a complementary bore of the closing plate 27 in an axially readily displaceable manner. The connection between the locking bolt 29 and the closing plate 27 is consequently telescopic. This guarantees that the connecting rod bearing 14,14'; 15,15' can be attached by screw bolts 47,48 to the frame of the chassis 19 or the front axle support without play on both sides.

A displacement zone 20 for the hydraulic fluid 13 is thus created in this manner between the junction point 16 of the axle connecting rod 18 on the connecting rod bearing 14,14'; 15,15' and the junction point 17 of the connecting rod bearing 14,14'; 15,15' on the chassis 19. If the chassis 19 is decelerated on braking of the motor vehicle during driving in the direction indicated by the arrow, the elastic bellows 26 is compressed, so that the portion of the elastic sleeve 25 adjoining the hydraulic fluid 13 acts as a hydraulic piston 23. Part of the hydraulic fluid 13 is thus ejected from the connection bore 28 into a hydraulic tube 21,21'; 22,22', and this fluid will thus enter an expansion chamber 12 in one of the steering tie rods 10,11.

After braking, the sleeve 25 and especially the bellows 26 expand, so that the original volume shown in FIG. 2 is again available for receiving the hydraulic fluid 13, and the hydraulic fluid is again able to flow back into the displacement zone 20 through the connection bore 28.

According to FIG. 3, each steering tie rod 10,11 has a hydraulic cylinder 30 into whose cylindrical bore a hydraulic piston 31 is inserted, whose piston rod 34 reaches out of the cylinder 30 through a guide bush 40 and carries at its end turned away from the cylinder 31 the connecting pin 35 for linking the steering tie rod 10,11 to the steering tie rod lever 36 and 37, respectively. The guide bush 40 is screwed into the cylindrical bore of the cylinder 30 of the steering tie rod 10,11. To protect the zone in which the piston rod 34 passes through the guide bush 40 from contamination, a bellows 54 is provided, one end of which is placed in a tightly sealing relationship on the piston rod 34 and the other end of which is placed in a tightly sealing relationship on the external circumferential surface of the cylinder 30.

A compression coil spring 38, which presses the hydraulic piston 31 into its end position, in which it abuts against the bottom 39 of the cylinder 30, is supported on the end face of the guide bush 40 which is located in the cylindrical bore. An axial connecting bore 55, into which a radial connecting bore 56 for the hydraulic tubes 21,21'; 22,22' opens, is provided in the bottom 39 of the cylinder 30.

A steering tie rod section 32 is integral with the cylinder 30 of the steering tie rod 10,11, and the end of the steering tie rod section which is turned away from the cylinder 30 is provided with a fastening means 33, especially a screw thread, with which the steering tie rod 10,11 can be fastened to an intermediate rod 43 leading to the steering mechanism 45.

The steerable front axle described functions as follows:

If a vehicle moving in the direction of the arrow in FIG. 1 is braked, hydraulic fluid is forced, as was described, from the displacement zones 20 of the connecting rod bearings 14,14'; 15,15' into the hydraulic tubes 21,21' and 22,22', and from there, it enters the expansion chambers of the steering tie rods 10 and 11, respectively, provided between the bottoms 39 and the hydraulic pistons 31 via the connecting bores 56 and the connecting bores 55. The pistons 31 of the steering tie rods 10,11 are thus pushed away from the bottoms 39 of the cylinders 30 against the force of the compressive coil spring 38, so that the space between the connecting pins 35 and the corresponding fastening means 33 is increased, i.e., the length of the steering tie rod 10,11 is increased. The front wheels connected to the steering knuckles 41 are thus turned in, so that the toe-in is increased.

If the vehicle is braked on a road surface with uniform coefficient of friction, and the action of the brakes is assumed to be equal, the forces acting on the connecting rod bearings 14,14' of the left front wheel will be equal to the forces acting on the connecting rod bearings 15,15' of the right front wheel. The toe-in setting of the two wheels is thus also the same.

However, if during braking, the right wheels of the vehicles run on a road surface whose coefficient of friction is greater than that of the road surface on which the left wheels of the vehicle run, different forces will act on the connecting rod bearings 14,14' and 15,15' of the left and right front wheels.

If it is assumed, for example, that the right wheels of the vehicle run on an icy road surface, while the left wheels run on a dry road surface, the vehicle will be braked more strongly on the left side, so that a yawing accelerationn is generated which seeks to swerve the vehicle to the left. However, since the forces acting on the connecting rod bearings 14,14' associated with the left front wheel are also greater than the forces acting on the connecting rod bearings 15,15' associated with the right front wheel as a consequence of the stronger braking of the left wheels of the vehicle, more hydraulic fluid 13 will also be forced from the left connecting rod bearings 14,14' into the expansion chamber 12 of the left steering tie rod 10 than on the right side of the vehicle. The left steering tie rod 10 will thus extend to a greater length than the right steering tie rod 11, so that the left front wheel will be toed in more than the right front wheel.

Due to the greater toe-in of the left front wheel compared to the toe-in of the right front wheel, a force is exerted on the vehicle which seeks to swerve the vehicle to the right. This force opposes the force generated by the yawing movement and is selected such that it will precisely eliminate the yawing movement.

The straight-line stability of the vehicle is thus substantially improved, and the vehicle is prevented from serving on a road surface with different coefficients of friction.

However, the steerable front axle described here also makes it possible to compensate for yawing accelerations which may occur in the case of non-uniform braking of the right and left sides of the vehicle during braking on a surface with essentially uniform friction characteristics. One reason for such non-uniform braking may be, e.g., different amounts of wear of brakes, different amounts of wear of the vehicle tires or non-uniform loading of the vehicle. The forces acting on the connecting rod bearings 14,14' on the left side of the vehicle will be different from the forces acting on the connecting rod bearings 15,15' of the right side of the vehicle in this case as well, so that toeing-in of the front wheels, which counteracts the yawing accelerations, will also be achieved here.

As soon as braking of the vehicle stops, the forces acting on the individual connecting rod bearings 14,14'; 15,15' will also disappear, so that the expansion zone 20 will again resume its normal volume. The hydraulic fluid is not drawn back from the associated expansion chambers 12 of the steering tie rods 10,11 into the corresponding displacement zone 20. This process is supported by the compressive coil spring 38 which acts on the hydraulic piston 31 toward the bottom 39 of the cylinder 30. As soon as the piston 31 reaches its end position, in which it has displaced the total amount of hydraulic fluid 13 from the expansion chamber 12, it is held in its end position by the compressive coil spring 38, so that the front wheels are toed into the toe-in position provided for normal driving.

The embodiments of the invention in which an exclusive property or privilege is claimed are defined as follows:

1. Steerable front axle for motor vehicles, comprising a steering knuckle for each of the two front wheels which is rotatably mounted on at least one axle connecting rod pivoted on the chassis via a connecting rod bearing, in which the axes of rotation of the connecting rod bearings are essentially arranged in the longitudinal direction of the motor vehicle, and one steering tie rod each associated with each of the front wheels, which steering tie rod is linked with a steering tie rod lever connected to the corresponding steering knuckle, in which a steering mechanism connected to the steering tie rods is arranged between the two steering tie rods, characterized in that, for hydraulic length adjustment, the steering tie rods have an expansion chamber to which a hydraulic fluid can be admitted and that both the connecting rod bearings associated with each of the front wheels have a hollow displacement zone between the junction points of the axle connecting rod and the chassis which displacement zone is compressible in the longitudinal direction of the vehicle and in which the hydraulic fluid is housed which enters the expansion chamber of the steering tie rod of the associated front wheel via a hydraulic tube in the case of the compression of the displacement zone which occurs during braking.

2. Front axle in accordance with claim 1, in which each steering knuckle is supported pivotedly on the chassis with a front and a rear axle connecting rod arm by means of a connecting rod bearing each, characterized in that each connecting rod bearing has a hollow displacement zone.

3. Front axle in accordance with claim 1 or 2, characterized in that the displacement zone of the left and right connecting rod bearings form a closed hydraulic system with the expansion chamber of the left and right steering tie rod, respectively.

4. Front axle in accordance with claim 3, characterized in that the displacement zone has a hydraulic piston and a hydraulic cylinder which are elastically pretensioned away from each other.

5. Front axle in accordance with claim 4, characterized in that each axle connecting rod or each axle connecting rod arm is mounted on an elastic sleeve which has a bellows vulcanized into the cylinder on the chassis mounting side, which bellows surrounds the hydraulic fluid limited by the sleeve, and that on the side turned away from the bellows, the cylinder is connected to a closing plate attached to the chassis, which plate limits the hydraulic fluid on the side opposite the sleeve and has a connection bore for the hydraulic tube leading to the steering tie rod, in which the connecting rod bearing is attached to the chassis with a vulcanized locking bolt on the opposite side.

6. Front axle in accordance with claim 1, characterized in that each steering tie rod has a hydraulic cylinder in which a hydraulic piston defining an expansion chamber is arranged, and the piston is elastically pretensioned against the hydraulic cylinder.

7. Front axle in accordance with claim 6, characterized in that a first steering tie rod section is integral with the hydraulic cylinder of the steering tie rod with a fastening means arranged on it, and that a piston rod of the hydraulic piston, projecting from the hydraulic cylinder, forms a second steering tie rod section, and a connecting pin for linking the steering tie rod with the steering tie rod lever is arranged at the end of the second steering tie rod section which is turned away from the piston.

8. Front axle in accordance with claim 6 or 7, characterized in that the hydraulic piston of the steering tie rod is pretensioned by a compressive coil spring against the bottom of the hydraulic cylinder against which bottom abuts the hydraulic piston in its end position.

9. Front axle in accordance with claim 8, characterized in that the compressive coil spring, one end of which is supported by the side of the hydraulic piston turned away from the expansion chamber, is supported at its other end by a guide bush for the piston rod of the hydraulic piston, which bush is inserted in the hydraulic cylinder.

* * * * *